Figure 1:
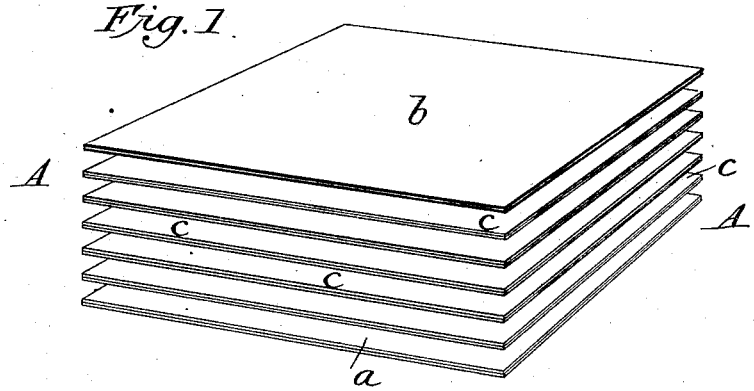

(No Model.)

A. J. GEAR.
SHADED DENTAL RUBBER.

No. 448,795. Patented Mar. 24, 1891.

Attest.

Inventor
Alfred Joseph Gear
by his attorney

UNITED STATES PATENT OFFICE.

ALFRED JOSEPH GEAR, OF LONDON, ENGLAND.

SHADED DENTAL RUBBER.

SPECIFICATION forming part of Letters Patent No. 448,795, dated March 24, 1891.

Application filed October 23, 1889. Serial No. 327,943. (No specimens.) Patented in England September 4, 1888, No. 12,766.

*To all whom it may concern:*

Be it known that I, ALFRED JOSEPH GEAR, a subject of the Queen of Great Britain, residing at No. 9 South Side, Clapham Common, in the county of Surrey, England, have invented certain new and useful Improvements in Dental Rubber and in the Process of its Manufacture, (for which I have obtained Letters Patent in Great Britain, No. 12,766, bearing date September 4, 1888,) of which the following is a specification.

Dental rubber commonly employed for setting artificial teeth is of a uniform color, no provision being made to imitate closely the natural appearance of the gums. An attempt has been made to imitate the natural appearance of the mouth by forming a vulcanizable compound of variously-colored rubber finely comminuted and commingled to form a mottled mass, which is subsequently suitably shaped and vulcanized.

My improved dental rubber is shaded from one edge to or toward the other, so that by arranging the teeth at the lightest edge with the shade or tint of the gum gradually growing deeper or darker from this edge a more natural appearance is produced.

In carrying out my invention I first make a sheet of very pale pink rubber, either by the admixture of the ordinary pink and white dental rubbers in the approximate proportions of one part of pink dental rubber to three parts of white; or, by mixing caoutchouc with the necessary amount of sulphur for vulcanizing purposes and adding coloring-matter, so as to form a very pale pink rubber. I then make another sheet in the same way, but add a little more of the pink rubber or pink coloring-matter to get a slightly darker shade. I continue to make sheets in this way, but gradually making them darker in color until the deepest shade of pink required is reached. I next place upon the lightest sheet the sheet next darker in color, and so on, until a thick block is formed. This block is passed between rollers or acted upon by other suitable devices to give a gentle pressure, so as to bring the sheets of rubber composing the block into perfect cohesion with each other. After the sheets are thus pressed together the block presents sides or ends with the color or tint gradually increasing from light to dark from top to bottom or from one edge to the opposite edge on the same side of the block. Not only are the outside faces of the block thus colored, but the same variation in color extends throughout the block, and the block may be cut into numerous bars or strips, with each strip similarly shaded. In practice I cut the block transversely into strips or narrow sheets or bars, such strips being of the thickness and width convenient for packing in the flask previous to vulcanizing.

My shaded rubber may be used by itself or as a coating for the ordinary dental rubber.

Figure 2:
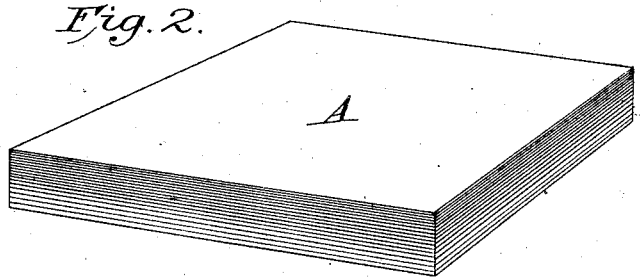
Figure 3:
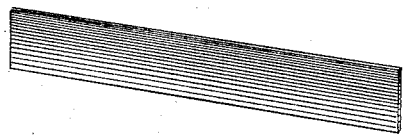

In the accompanying drawings, Figure 1 is a perspective view of a number of sheets of differently-colored rubber ready to be formed into a block. Fig. 2 is a perspective view of a block with the rubber sheets united. Fig. 3 is a perspective view of a strip cut from the block ready for use.

In the block A (shown in Fig. 1) the lightest sheet $a$ is arranged at the bottom and the darkest sheet $b$ at the top. The shade or tint of the intermediate sheets $c$ gradually increases in depth from the bottom sheet to the top one. After pressure has been applied and the several sheets are united, as indicated in Fig. 2, the colors blend and a graceful, natural, gradually-increasing shade or tint from bottom to top of the block is produced.

My improved dental rubber may be vulcanized and polished in the usual way, but the teeth should be so arranged that the lightest edge of the rubber shall be next the teeth.

I claim as my invention—

1. A strip, sheet, or block formed of separate sheets or strips of rubber, each of a solid color, united and having a light strip at one end and a comparatively dark strip at the other, and strips variously colored or tinted in regular order from light to dark between the end strips.

2. The process herein described of manufacturing shaded dental rubber, which consists in arranging in regular gradation of color a number of sheets of differently-tinted rubber, each having a solid color, pressing the sheet into a block, and then cutting the block transversely into strips, substantially as described.

ALFRED JOSEPH GEAR.

Witnesses:
WM. L. COOPER,
29 *Essex Street, London, England, Patent Agent.*
ERNEST EDWARD STEWART,
*Clerk to Wm. L. Cooper, Esqre.*